(12) United States Patent
Vallone et al.

(10) Patent No.: US 9,571,517 B2
(45) Date of Patent: Feb. 14, 2017

(54) SYNTHETIC CYBER-RISK MODEL FOR VULNERABILITY DETERMINATION

(71) Applicant: Goldman, Sachs & Co., New York, NY (US)

(72) Inventors: David Vallone, Bridgewater, NJ (US); Peter Taylor, Richmond Hill, NY (US); Phil J. Venables, Jersey City, NJ (US); Ruoh-Yann Huang, Princeton, NJ (US)

(73) Assignee: Goldman, Sachs & Co., New York, NY (US)

( * ) Notice: Subject to any disclaimer, the term of this patent is extended or adjusted under 35 U.S.C. 154(b) by 215 days.

(21) Appl. No.: 14/538,193

(22) Filed: Nov. 11, 2014

(65) Prior Publication Data

US 2016/0134653 A1    May 12, 2016

(51) Int. Cl.
  *G06F 11/00* (2006.01)
  *H04L 29/06* (2006.01)
  *H04L 12/24* (2006.01)

(52) U.S. Cl.
  CPC ......... *H04L 63/1433* (2013.01); *H04L 41/147* (2013.01)

(58) Field of Classification Search
  CPC .. G06F 21/577; H04L 63/1416; H04L 63/145; H04L 63/433

USPC ...................................................... 726/22, 25
See application file for complete search history.

(56) References Cited

U.S. PATENT DOCUMENTS

| | | | |
|---|---|---|---|
| 7,930,747 B2* | 4/2011 | Durie et al. | 726/23 |
| 2004/0098623 A1* | 5/2004 | Scheidell | 713/201 |
| 2010/0138925 A1* | 6/2010 | Barai et al. | 726/25 |
| 2014/0237599 A1* | 8/2014 | Gertner et al. | 726/24 |
| 2014/0245439 A1* | 8/2014 | Day | 726/23 |

FOREIGN PATENT DOCUMENTS

WO    WO2014066500 A1 *  1/2014

* cited by examiner

*Primary Examiner* — Ali Abyaneh

(57) ABSTRACT

A system, method, and device are presented for assessing a target network's vulnerability to a real cyberthreat based on determining policy-based synthetic tests configured to model the behavior of the cyberthreat. Real-time feedback from the target network (e.g., servers, desktops, and network/monitoring hardware and/or software equipment) are received, analyzed, and used to determine whether any modifications to the same or a new synthesized test is preferred. The technology includes self-healing processes that, using the feedback mechanisms, can attempt to find patches for known vulnerabilities, test for unknown vulnerabilities, and configure the target network's resources in accordance with predefined service-level agreements.

27 Claims, 8 Drawing Sheets

SYNTHETIC CYBER-RISK MODEL FOR VULNERABILITY DETERMINATION

TECHNICAL FIELD

The present disclosure relates generally to systems, apparatuses, and methods for modeling risk of cyber-attacks based on synthesizing tests using characteristics of a real cyber-risk for assessing network vulnerabilities and providing real-time feedback for dynamic modification of ongoing synthesized testing.

BACKGROUND

Cyberthreats, in various embodiments, are incidents related to a compromise of a computer network, including one that leads to a loss of one or more assets or one in which the originator of the incident intends to effect a loss as an objective of the threat. Damages resulting from cyber-attack campaigns, like the 2013-2014 string of attacks on Target's® networks that resulted in theft of more than 40 million credit card details, the May 2014 eBay® attacks that resulted in theft of 233 million user records, and the September 2014 attacks on Home Depot® that allowed hackers to steal 56 million customer debit and credit card numbers, demonstrate the growing severity of the impact of cyberattacks on corporate and personal data. The immediate sources of damage to assets may include, for example, data deletion, data corruption, data theft, release of protected data to the public, goodwill and reputational loss, system downtime loss, equipment loss, immediate revenue and subsequent financial loss, business continuity interruption, and the internal costs of detection, investigation of suspected breaches, containment of breaches, recovery of systems, and ex post facto responses, including the costs of legal ramifications such as class action lawsuits or other litigation, among others. Subsequent damages can range from loss of intellectual property (IP) by data theft to downtime of supervisory control and data acquisition (SCADA) systems or other control systems, which may lead to losses of product manufacturing, delivery of critical services, and casualties, including human injury or loss of life.

An organization's assets residing on computer networks have become more difficult to protect as assets and networks have grown in size and complexity. Businesses, governments, and other organizations have expanded computer network access internally across a growing number of fixed and mobile computers and devices authorized for employee access, as well as access externally to public and private cloud environments and trusted customers/clients, vendors and suppliers. The growth of these access points greatly increases the exposure of organizational assets to potential compromise and loss.

At the same time, network security teams are confronted by a number of challenges, including the large number of channels into an organization (Wi-Fi, USB flash drives, mobile devices, VoIP and the like), the size and diversity of the infrastructure requiring protection, the number and diversity of applications (including plug-ins), and the overwhelming amount of network traffic to monitor and scan— each evolving, sometimes dramatically, in complexity over time. Control systems, such as SCADA systems, that drive manufacturing, critical energy, transportation, and other operational systems, which once used to be isolated and analog in nature, are now migrating to digital systems and are progressively connected via the Internet for online licensing, performance tracking, patching, and software updating. As a result, the exposure to attack through network pathways continues to increase.

Adding to the complexity, cybertools that target assets have become more sophisticated and are quickly and often quietly released to hacker communities, attackers' tactics and techniques are more advanced, and sophisticated commodity malware in illicit markets is more accessible to a global set of attackers. The networks they target extend across different devices and site locations globally, and competing security monitoring and/or prevention products ("monitoring capabilities") (e.g., firewalls, anti-virus software, proxy servers, intrusion detection systems (IDSs), and operating system-based vulnerabilities in the marketplace) in many cases have not kept pace with existing and emerging threats, such as intentional attacks (e.g., viruses, Trojans, rootkits, zero-day exploits, accidents, and system failures) ("cyberthreats").

DETAILED DESCRIPTION

Figure 1A:
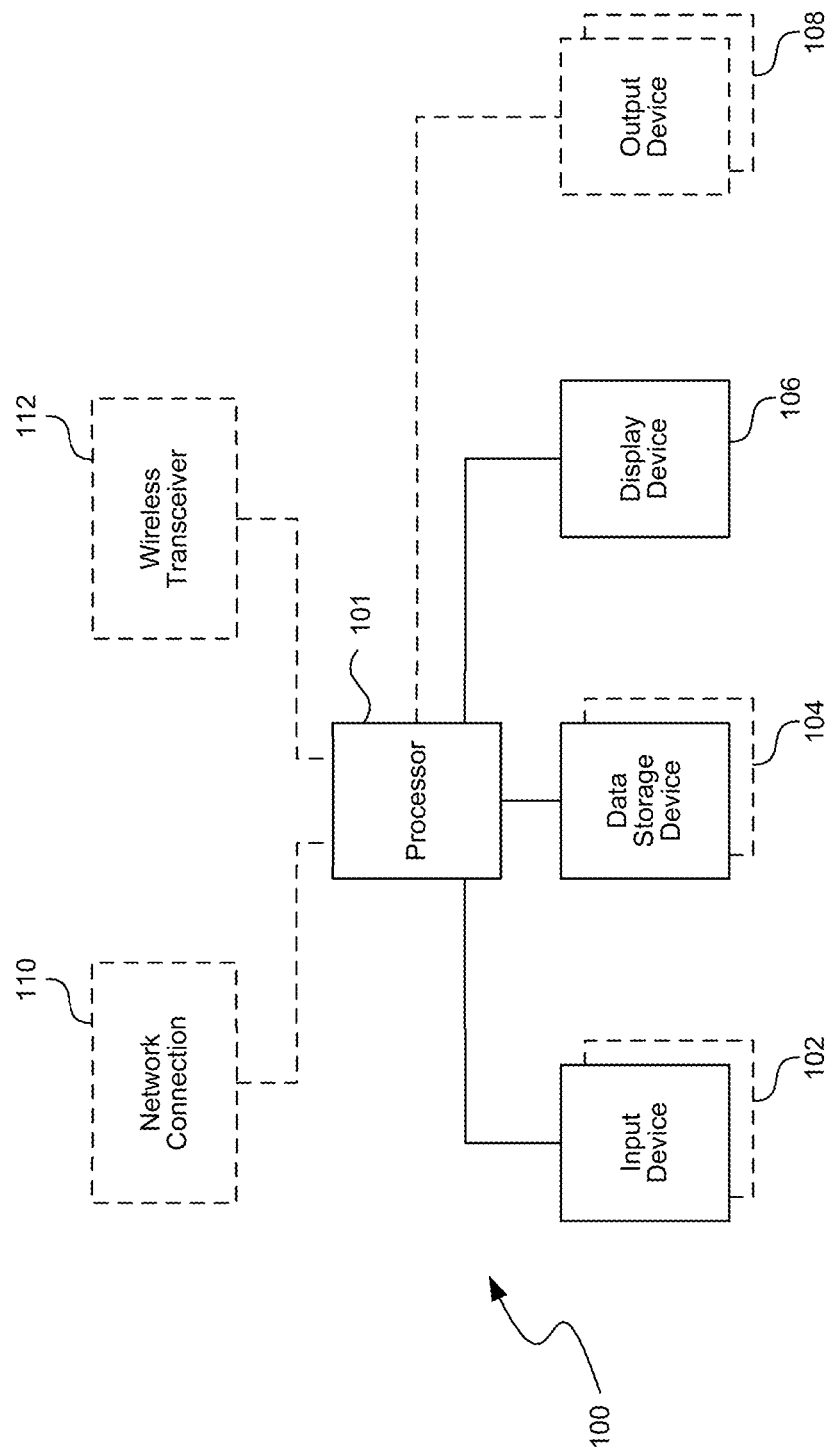
FIG. 1A is a block diagram of a basic and suitable computer that may employ aspects of the described technology.

Introduced below are methods, devices, and systems (collectively herein referred to as "technology") related to generating synthetic security events, representative of actual cyberthreat activity, for testing the effectiveness of a network's detective and preventative information security controls. The technology is capable of relatedly simulating simple and complex threat scenarios, with optional variation of threat attributes, at defined or random execution times, as a means of measuring information security sensor and process effectiveness in detecting and/or responding to direct threat scenarios representative of those targeting a network.

In various embodiments, the technology includes synthetic test host agents ("agents"), configured for installation at various endpoints throughout a target network (e.g., a physical, logical, and/or virtual network), and an orchestration layer to distribute instructions to the agent, as well as to receive feedback from the target environment after one or more synthetic tests have been executed. The technology can dynamically create new or instantiate existing agents into a target network. Agents are installed at one or more host computing devices ("hosts"), such as a stand-alone security device (e.g., an IDS or firewall) and/or a multipurpose device (e.g., a device such as a Windows®, Linux, or commodity-based operating system). Hosts, in various embodiments, are physical items and their subsystems that can be affected by a cyberthreat and include, but are not limited to, computers (laptops, servers, storage devices, mobile devices), data storage devices (e.g., file systems and database devices) and networks (e.g., hubs, switches, routers, hybrid devices, firewalls, IDSs, proxies, Network Operating Center (NOC) equipment, and other communication devices, such as a smart grid, home automation equipment, etc.). The technology can automatically configure, install, and provision agents, via a host device, for use in the synthetic testing described herein. For example, the technology can determine that, for a particular Debian Linux server or Windows 7® host server/desktop, an agent will need to be installed in a certain directory, have instructions to execute in a particular sequence, and use a particular user/system permission (e.g., running as root or a superuser). Agents can be predefined and instantiated on target network devices to efficiently provision the target network for a synthetic test or, in one or more environments, the technology can automatically determine (e.g., based on network/system communication with a host device) the operating system, version, and system configurations (e.g., available disk space and RAM) and then dynamically determine one or more agents designed to operate on that particular host device. The technology can communicate with hosts and control the operation of one or more agents via standard or proprietary communications technology, such as sending commands over a network to a host's communication port (e.g., TCP/UDP port) at which the agent is configured to listen to and communicate data.

The technology, in some embodiments, receives threat indicators, behaviors, and/or objectives (e.g., a primary or secondary result desired by the attacker and/or as a consequence of the cyberthreat and includes, e.g., theft of data, willful corruption of data, deletion/redirection/injection of data and denial-of-service attacks that interfere with the use of computer resources by customers and internal personnel) and/or events (collectively referred to herein as "characteristics"), such as generating a file, creating a network communication, accessing a user account/directory/database/registry, a sequence of actions performed by the threat etc. For example, a threat characteristic, in one or more embodiments, is a threat's signature, action, sequence of actions or other consequence of the real threat being executed. Threat characteristics can be obtained via a public/pseudo-public/private repository, database, file, website, software, and/or other means for storing data.

The technology, in various embodiments, defines a sequence of one or more synthetic characteristics and/or events ("instructions") intended to exhibit, via an agent, the real threat's characteristics. Characteristics are mapped to instructions via logic (e.g., logical steps in a programming language, script, program, text file, or database) that when executed by an agent would achieve or approximately achieve an objective of the cyberthreat. The instructions are distributed, in one or more embodiments, in accordance with a synthetic test's policy that can define a schedule, frequency, and location (e.g., one or more hosts) for one or more agents. The agent can simulate characteristics of the cyberthreat to exercise a target network's sensor environment's capabilities at detecting cyberthreats within an organization's network(s). A network sensor environment can include, for example, one or more networks, desktops, mobile devices, servers, security devices, routers, switches, firewalls, IDSs, proxy servers, supervisory systems, or other security technology configurable to monitor data/network activity (collectively referred herein as "monitoring capabilities").

The technology, in some embodiments, provides validation feedback associated with the progress and/or result of the instruction's execution to ensure that the expected characteristic is triggered and that any responses (e.g., the monitoring capabilities' responses to the synthetic tests, such as site (re)configuration or agent updating) occur within one or more predefined service levels (e.g., a firewall closing a TCP port after two seconds of detecting illicit activity). Feedback is available via host devices, agents, and monitoring capabilities during any step of one or more instructions of a synthetic test.

In an example scenario, threat intelligence is received that there is a class of malware that has the following characteristics: it creates a binary called c:/temp/malware.exe, creates a registry entry called HKLM/malware/installed, and periodically attempts to communicate to a malware.com website via TCP port 443. The technology, in one or more embodiments, defines a series of instructions (e.g., a script or program) that, when carried out by one or more agents, will exhibit the malware's threat characteristics. A policy for a synthetic test can be defined which states that, for example, each day between the hours of 8:00 and 11:00 UTC, three agents will be created at three respective hosts across the target network(s)—one in the Americas region, one in the EMEA region, and one in the Asia Pacific region. The technology, in various embodiments, orchestrates any necessary instantiation/installation of agents at hosts to meet the testing policy requirements and deploys the instructions to agents on each target network taking part in the test. At an appropriate time, the agents' instructions are initiated for execution by the technology with the intent of generating the threat's characteristics into the target environment for detection/response by the monitoring capabilities. The technology can control single agents or simultaneously control multiple agents (on the same or different target networks) to simulate simple cyberthreats (e.g., redirection to a rogue website) or complex attack scenarios (e.g., a distributed denial-of-service attack). The synthetically generated threat characteristics can then be processed by the monitoring capabilities and, where appropriate, a response to the threat can be followed (e.g., closing TCP port 443). Validation feedback data (e.g., status, indicia, updates, the number of an instruction's steps completed/not completed, the monitoring capabilities' detection/response data), in one or more embodiments, are received from the target network so that the target network's effectiveness can be measured and recorded (e.g., via an electronic and/or physical report) and, if relevant, additional instructions can be initiated to carry out additional characteristics. For example, if an instruction has multiple steps (e.g., install a file named trojen.pl in /root, next create a user with permission read/write/execution privileges, and then open TCP port 4545 for receiving malware), each step can send feedback regarding its progress (e.g., whether the step was successful, failed, was interrupted, etc.). Based on the feedback, the technology can halt a second step if a first step fails, insert a new step to perform a different operation, continue the sequence as-is, or otherwise manipulate the synthetic test in real time. A new and/or improved plan/strategy (e.g., in the form of data, metadata, database entries, and/or an electronic or physical report) for implementing the cyberthreat's objectives can, in various embodiments, be determined based on the feedback for automatically or manually (e.g., via an administrator) configuring or reconfiguring agents during and/or after each step of an instruction, based on a desired behavior (e.g., modify known cyberthreat objectives with additional potential objectives to determine whether adaptations of the cyberthreat can affect a target network).

Based on an analysis of the validation feedback data, in one or more embodiments, the technology can dynamically update the target network's security capabilities to, e.g., protect against the same and/or an other vulnerability. For example, if analysis indicates that the target is vulnerable to a cyberattack (i.e., based on the synthetic test using the cyberattack's characteristics) or is at or near a defined threshold (e.g., service level one, indicating a moderate vulnerability, service level two, indicating a severe vulnerability, or service level three, indicating a critical vulnerability), the technology can automatically update the target network' monitoring capabilities such as by updating firewall rules or by downloading and/or installing updates, firmware, new releases, antivirus rules, etc. This self-healing process alleviates some of the time-consuming measures used by system administrators to handle security updates and provides greater efficiency, especially when there are hundreds of computing devices (e.g., host computing devices, servers, operating systems, routers/switching equipment, and monitoring capabilities) that can be spread across different geographies and/or different target networks.

In various embodiments, after a self-healing process is performed, the technology retests that target network to verify that the vulnerabilities are patched, the threat is eliminated or decreased to an acceptable level (e.g., moving from a service level three threat to a service level one threat), and/or a new vulnerability on the target network is not now available after installing any updates for the original threat. In some embodiments, the technology can repeat the self-healing process (e.g., if the threat is not acceptably reduced) and contact different resources for providing different and/or additional tools, knowledge, files, configurations, updates, etc. for healing the target network. This process can be repeated dynamically until the threat is sufficiently reduced.

In one or more embodiments, the technology can attempt to heal the target network based on previously unknown solutions for addressing the vulnerability. In other words, when a known solution (e.g., a virus update for virus detection software) is not available or sufficient, the technology can address the vulnerability dynamically, based on a configurable set of rules (e.g., rules defined in a policy for the synthetic test. For example, if a virus update is not available to address a cyberthreat, the technology can automatically configure the target network by, e.g., dynamically terminating network communication ports used by a switch/router; create (or enable existing) firewall rules fail the target network so that network traffic is routed to a safe, failover network; and route traffic to a demilitarized zone (DMZ) for further analysis in a sandbox network, etc. Each of the self-healing procedures (i.e., using known or unknown solutions to address the cyberthreat) can be used individually, together, and at different times/conditions during the synthetic testing.

The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

Certain details are set forth in the following description and in FIGS. 1-6 to provide a thorough understanding of various embodiments of the disclosure. Other well-known structures and systems often associated with cyber-risks and network security systems have not been shown or described in detail below to avoid unnecessarily obscuring the descriptions of the various embodiments of the disclosure. Additionally, a person of ordinary skill in the relevant art will understand that the disclosure may have additional embodiments that may be practiced without several of the details described below. In other instances, those of ordinary skill in the relevant art will appreciate that the methods and systems described can include additional details without departing from the spirit or scope of the disclosed embodiments.

Many of the details, dimensions, functions and other features shown and described in conjunction with the Figures are merely illustrative of particular embodiments of the disclosure. Accordingly, other embodiments can have other details, dimensions, functions and features without departing from the spirit or scope of the present disclosure. In addition, those of ordinary skill in the art will appreciate that further embodiments of the disclosure can be practiced without several of the details described below.

The terminology used in the description presented below is intended to be interpreted in its broadest reasonable manner, even though it is being used in conjunction with a detailed description of certain specific embodiments of the described technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 1B:
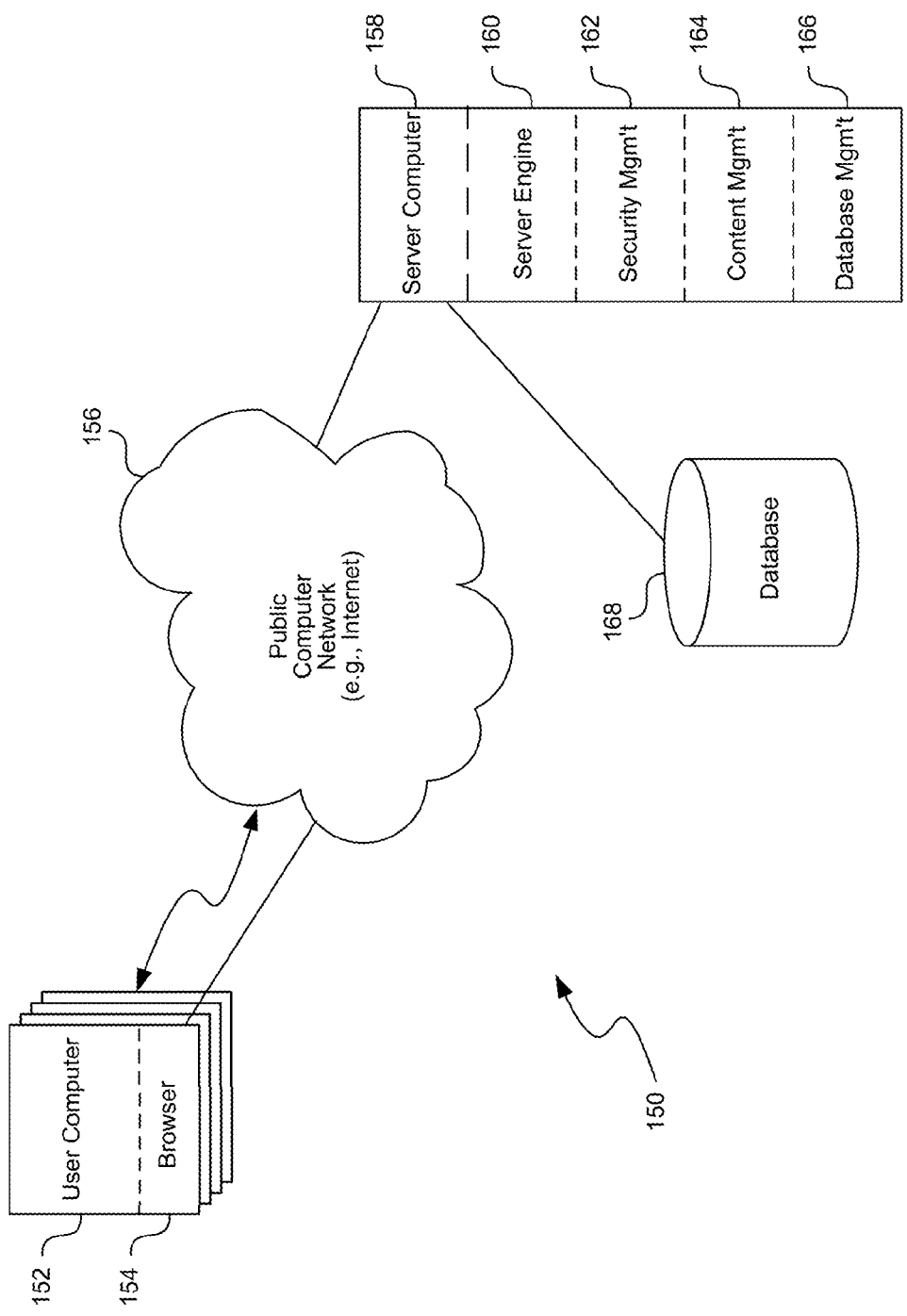
FIG. 1B is a block diagram of a basic and suitable network and network resources that may employ aspects of the described technology.

FIGS. 1A and 1B and the following discussion provide a brief, general description of a suitable computing environment in which aspects of the described technology can be implemented. Although not required, aspects of the described technology may be described herein in the general context of computer-executable instructions, such as routines executed by a general- or special-purpose data processing device (e.g., a server or client computer). Aspects of the described technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the described technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (packet switched, circuit switched, or other scheme).

The described technology can also be practiced in distributed computing environments where tasks or modules are performed by remote processing devices, which are linked through a communications network, such as a Local Area Network (LAN), Wide Area Network (WAN), or the Internet. In a distributed computing environment, program modules or subroutines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the described technology are also encompassed within the scope of the described technology.

Portions of the described technology can be practiced on and/or distributed between one or more network appliances. A network appliance is a stand-alone device connected to a network and can be configured to communicate with another network appliance, server, and/or other computing device.

Referring to FIG. 1A, the described technology employs a computer 100, such as a personal computer or workstation, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices, etc.). The computer 100 may be coupled to external computers, such as via an optional network connection 110, a wireless transceiver 112, or both.

The input devices 102 may include a keyboard, a pointing device such as a mouse, and described technology for receiving human voice, touch, and/or sight (e.g., a microphone, a touch screen, and/or smart glasses). Other input devices are possible, such as a joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1A).

Aspects of the described technology may be practiced in a variety of other computing environments. For example, referring to FIG. 1B, a distributed computing environment with a network interface includes one or more user computers 152 (e.g., mobile devices) in a system 150, each of which includes a graphical user interface (GUI) program component (e.g., a thin client and/or browser component) 154 that permits the computer to access and exchange data, such as network and/or security data, with a network 156 such as a LAN or the Internet, including web sites, ftp sites, live feeds, and data repositories within a portion of the network 156. The user computers 152 may be substantially similar to the computer described above with respect to FIG. 1. The user computers 152 may be personal computers (PCs) or mobile devices, such as laptops, mobile phones, or tablets. The user computers 152 may connect to the network 156 wirelessly or through the use of a wired connection. Wireless connectivity may include any forms of wireless technology, such as a radio access technology used in wireless LANs or mobile standards such as 2G/3G/4G/LTE. The user computers 152 may include other program components, such as a filter component, an operating system, one or more application programs (e.g., security applications, word processing applications, spreadsheet applications, or Internet-enabled applications), and the like. The user computers 152 may be general-purpose devices that can be programmed to run various types of applications, or they may be single-purpose devices optimized or limited to a particular function or class of functions. More importantly, any application program for providing a graphical user interface to users may be employed, as described in detail below. For example, a mobile application or "app" has been contemplated, such as one used in Apple's® iPhone® or iPad® products, Microsoft® products, Nokia® products, or Android®-based products.

At least one server computer 158, coupled to the network 156, performs some or all of the functions for receiving, routing, and storing of electronic messages, such as security data, web pages, audio signals, electronic images, and/or other data. While the Internet is shown, a private network, such as an intranet, may be preferred in some applications. The network may have a client-server architecture, in which a computer is dedicated to serving other client computers, or it may have other architectures, such as a peer-to-peer, in which one or more computers serve simultaneously as servers and clients. A database or databases 168, coupled to the server computer(s), store some content (e.g., security-related data) exchanged between the user computers; however, content may be stored in a flat or semi-structured file that is local to or remote of the server computer 158. The server computer(s), including the database(s), may employ security measures to inhibit malicious attacks on the system and to preserve the integrity of the messages and data stored therein (e.g., firewall systems, secure socket layers (SSL), password protection schemes, encryption, and the like).

The server computer 158 may include a server engine 160, a security management component 162, a content management component 164, and a database management component 166. The server engine 160 performs basic processing and operating system-level tasks. The security management component(s) 162 handle creation, streaming, processing, and/or routing of networking and/or security data. The security management components 162, in various embodiments, include other components and/or technology, such as a forecasting input build component, damage forecast component, financial loss forecast component, run forecast component, and/or other components and/or modeling technologies, described below. Users may access the server computer 158 by means of a network path associated therewith. The content management component 164 handles processes and technologies that support the collection, managing, and publishing of security and/or network data and information and other data. The database management component 166 includes storage and retrieval tasks with respect to the database, queries to the database, and storage of data. In some embodiments, multiple server computers 158, each having one or more of the components 162-166, may be utilized. In general, the user computer 152 receives data input by the user and transmits such input data to the server computer 158. The server computer 158 then queries the database 168, retrieves requested pages, performs computations, and/or provides output data back to the user computer 152, typically for visual display to the user.

Figure 2A:
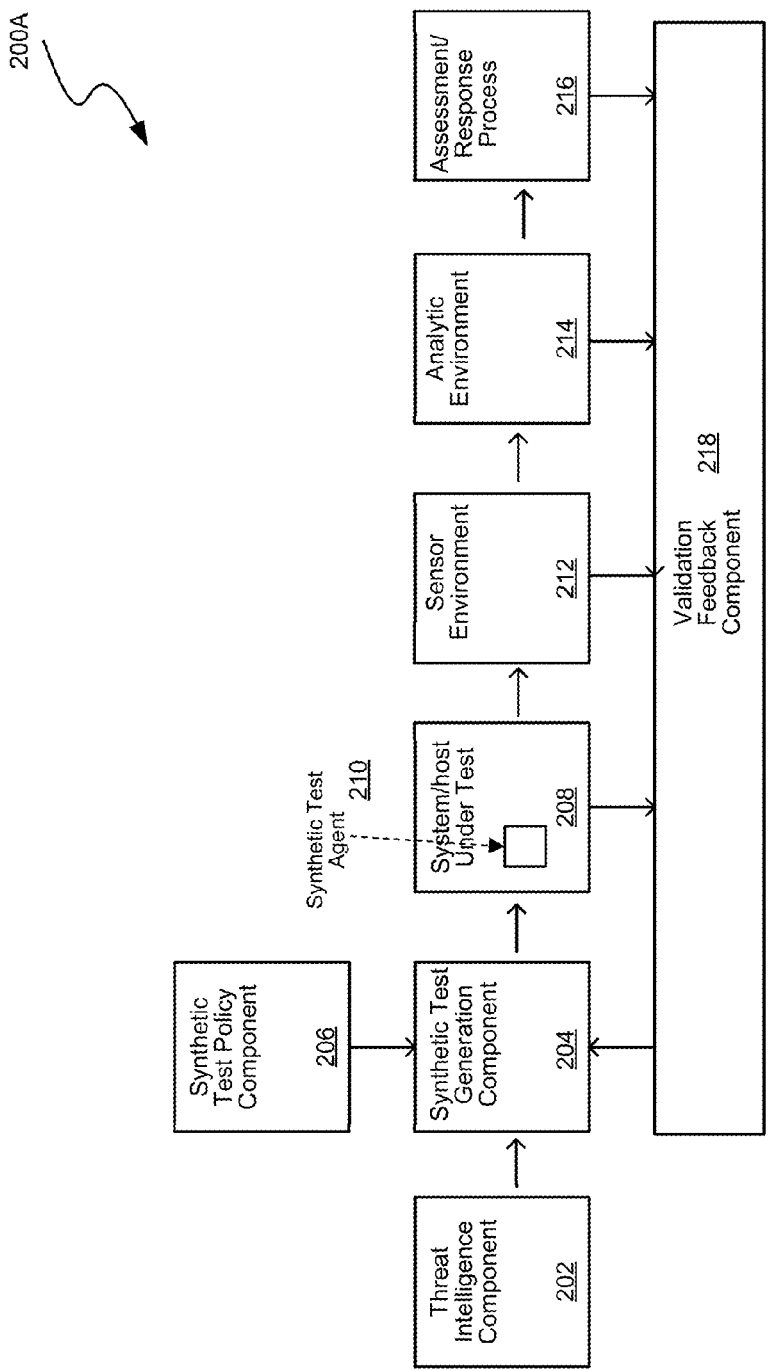
FIG. 2A is a block diagram of a unified cyber-risk assessment overlay that employs aspects of the described technology.

FIG. 2A is a block diagram 200A of a unified framework for synthetic cyber-risk vulnerability determination including several components and/or engines 202-206 and validation feedback component 218, synthetic test agent 210, sensor environment 212, analytic environment 214, and assessment/response process 216. The unified framework provides cyberthreat preparedness and adaptation mechanisms for use in protecting networks against exploitation. A threat intelligence component 202 gathers information regarding cyberthreats, a synthetic test generation component 204 determines one or more synthetic tests based on creating instructions for implementing one or more objectives of the cyberthreat, and a synthetic test policy component 206 configures one or more agents 210 to operate with one or more host/system devices under test 208 ("hosts") (e.g., a computer 100). Sensor environment 212, in one or more embodiments, contains monitoring technology that is configured to monitor at least host 208 activity for the occurrence of characteristics of the cyberthreat. An analytic environment 214 is configured to analyze and detect portions or all of the synthesized cyberthreat and, via one or more assessment/response processes 216, determine whether a target network should or has initiated any activity in response to detecting the cyberattack. The analytic environment 214, in some embodiments, operates on data produced by the sensor environment 212, internally and externally sourced threat and vulnerability data, as well as, in various embodiments, reference data describing the environment being monitored (e.g. such as host 208, network, and people inventory data). The analytic environment, in one or more embodiments, has technology that applies analytical techniques on the data produced by the sensor environment 212 for creating events that can inform the operator of the sensor environment 212 as to the efficacy of the entire system. The analytic techniques can include but are not limited to basic detection rules, machine learning, anomaly detection, behavioral analysis, baseline/profile deviation, and/or event correlation. For example, the sensor environment 212 can capture data to indicate that a user's Windows desktop has generated 3000 or more requests to various websites over the course of a 24-hour period. The analytic environment 214 applies a number of analysis techniques to the data, and identifies that, for example, 16 web requests to a single domain occur exactly 33 minutes and 27 seconds apart, indicative of an automated (and potentially malicious) process, rather than human-driven web browsing behavior. The host 208, sensor environment 212, analytic environment 214, and assessment/response processes 216 each are configured to separately and/or conjunctively communicate feedback data to the synthetic test generation component 204, which can further analyze the feedback and, optionally, initiate additional instructions (e.g., based on a defined policy). Feedback allows synthetic testing for cyberthreat vulnerabilities to be specified at higher levels of aggregation when details are not known, and allows for the progressive incorporation of higher-level detailed knowledge to allow improved resolution of modeling synthetic tests as more information is gained on the cyberthreat's objectives and characteristics, target network vulnerabilities, and other pertinent details. This has the added advantage of allowing for calibration of the synthetic testing based on different levels of aggregate data in order to, e.g., determine whether the target network is within a predefined, accepted service level and whether additional steps of an existing or new instruction are desired. While each of the components above was identified separately, the functionality of one or more of the components 202-206 and 218 can reside on a single or hybrid component that implements the same features as if the features were separate components. Additional details of one or more of the components 202-206 and 218, agent 210, environments 212 and 214 and processes 216 are described below and illustrated in the Figures.

Figure 2B:
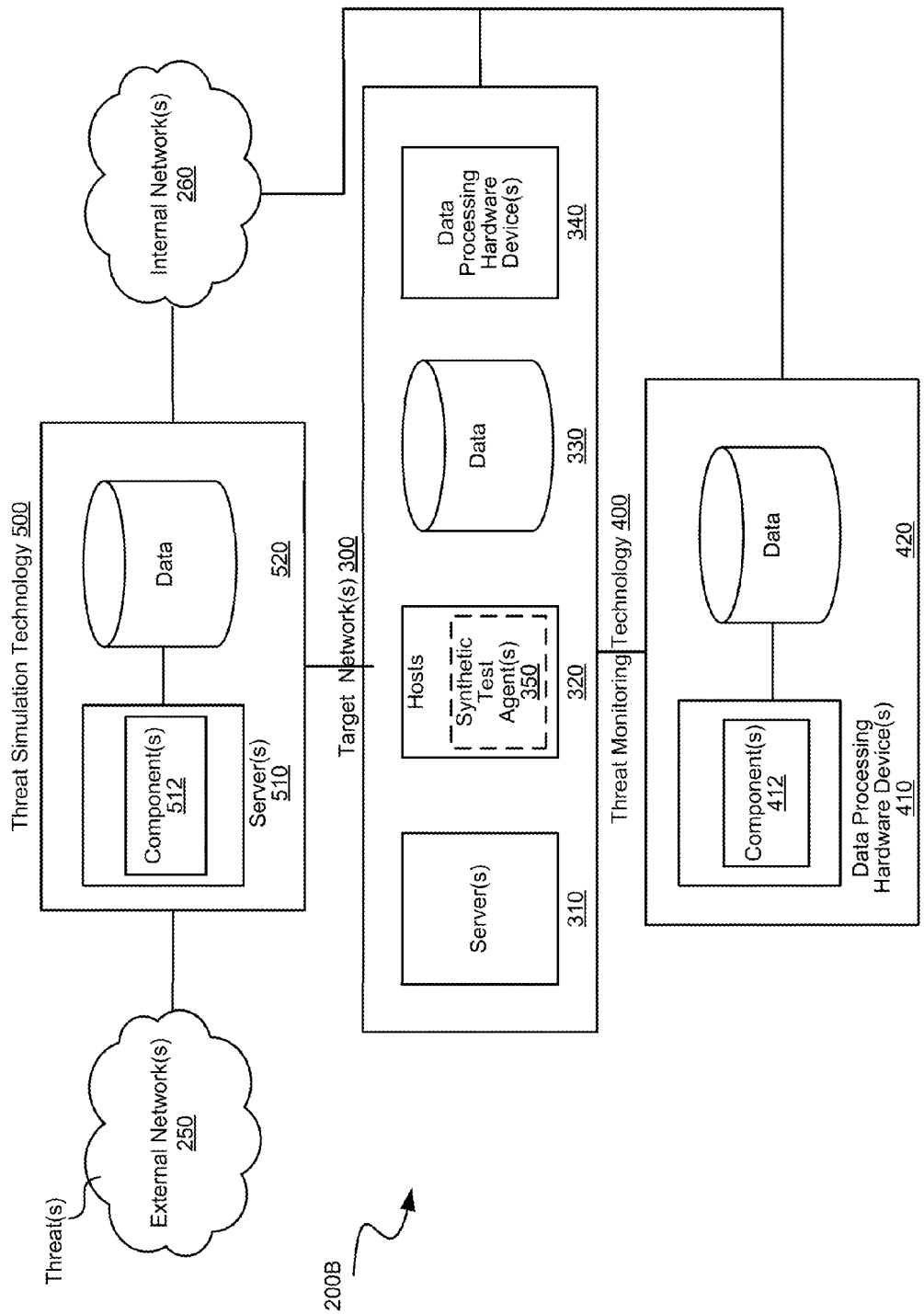
FIG. 2B is a block diagram illustrating a simple, yet suitable system in which aspects of the described technology may operate in a networked computer environment.

FIG. 2B is a block diagram of an exemplary network infrastructure 200B for implementing some or the entire unified framework for synthetic cyber-risk vulnerability determination. Exemplary network infrastructure 200B includes threat simulation technology 500, target network(s) 300, and threat monitoring technology 400, which are connected via internal network(s) 260. Threat simulation technology 500 is configured to communicate to external network 250 to, for example, receive information regarding cyberthreats. Optionally, target network(s) 300 and threat-monitoring technology 400 can be configured to communicate with external network 250. While each of threat simulation technology 500, target network 300 and threat monitoring technology 400 is illustrated having respective features, some features can be physically and/or logically combined. For example, target network 300 can include the threat monitoring technology 400. Each of the threat simulation technology 500, target network 300 and threat monitoring technology 400 is described further in FIGS. 3-5 and their respective features.

Figure 3:
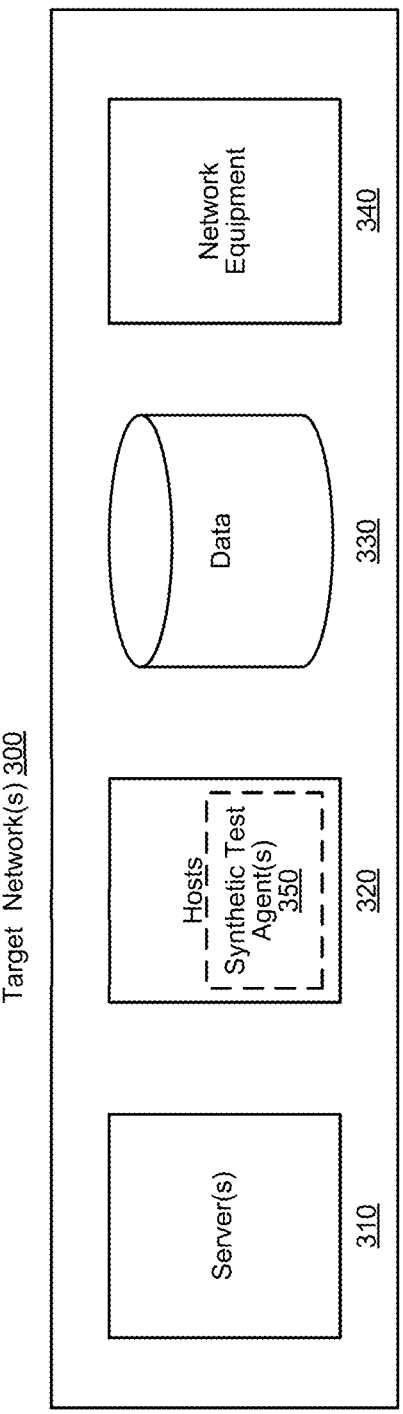
FIG. 3 is a block diagram of a target network that may employ aspects of the described technology.

FIG. 3 depicts a block diagram of target network(s) 300 including one or more servers 310, hosts 320 having one or more agents 350, data 330, and data processing hardware devices (e.g., network equipment) 340. Servers 310 and hosts 320 (e.g., a server computer 158 or user computer 152) contain features of server computer 158 for implementing aspects of the technology, such as hosting one or more agents 350. Data 330 can include any type of data that is or can be made available to servers 310, hosts 320 and network equipment 340. Data 330 may include unstructured, structured, and/or semi-structured information stored in a variety of formats and by a variety of storage devices (e.g., a file server, database, SAN, etc.). Network equipment 340 includes, in one or more embodiments, software and/or hardware communications devices (e.g., hubs, switches, routers, firewalls, proxy servers, etc.) that may additionally include threat-monitoring technology (e.g., as illustrated and described for FIG. 4) for detecting the cyberrisk vulnerabilities of the network 300. The technology (e.g., a server 510 of the threat simulation technology 500 (described below)), in some embodiments, installs and/or instantiates one or more agents 350 on a host 320. Agents 350 are configurable by the technology to execute instructions on a host 320 for performing characteristics of a cyberthreat as a means for determining whether the target network 300 would be vulnerable to the actual cyberthreat. An agent 350, in one or more embodiments, contains features that when configured with instructions can synthesize the characteristics of the cyberthreat. In some embodiments, when the agent 350 is initialized on a host 320, the agent 350 executes steps of the instructions as if the agent 350 were the actual cyberthreat (e.g., a malware agent will mimic the characteristics/actions of real malware). A cyberthreat may have various objectives (e.g., steal credit card and/or intellectual property data 330) as expressed by one or more tangible characteristics of the objective (e.g., install a file called "harvest.pl," create a user account "inconspicuous user," remove a service that monitors local file access, and initialize communications with an external computer) that, via the technology, are mapped to instructions (e.g., a program, script, service, data update, etc.) for carrying out the objectives on the target network 300. An administrator, or other entity, may want to know whether the target network 300 has been or could be vulnerable to a cyberthreat without installing the real cyberthreat within the target network 300. The technology has the advantage of being able to synthesize the cyberthreat (e.g., harvest.pl) as executable instructions that can be limited so that the ultimate objective of the cyberthreat (e.g., posting stolen credit card numbers for sale on the Internet) is not committed, while still providing an administrator with knowledge (e.g., via feedback from agent(s) 350 and/or network equipment 340) regarding the depth of vulnerability of the target network 300 to an actual attack. Feedback data (e.g., real-time and/or post-instruction data) from the agent(s) 350 and/or network equipment 340, in various embodiments, is sent to and/or accessed by the threat simulation technology 400, which can further analyze the data and, optionally, request an agent 350 to perform additional steps of an instruction or a new/modified instruction, as illustrated and described further in reference to FIG. 6. As discussed above, network equipment 340 can include features of threat monitoring technology 400; however, to simplify illustration and discussion, monitoring features are discussed in reference to FIG. 4.

Figure 4:
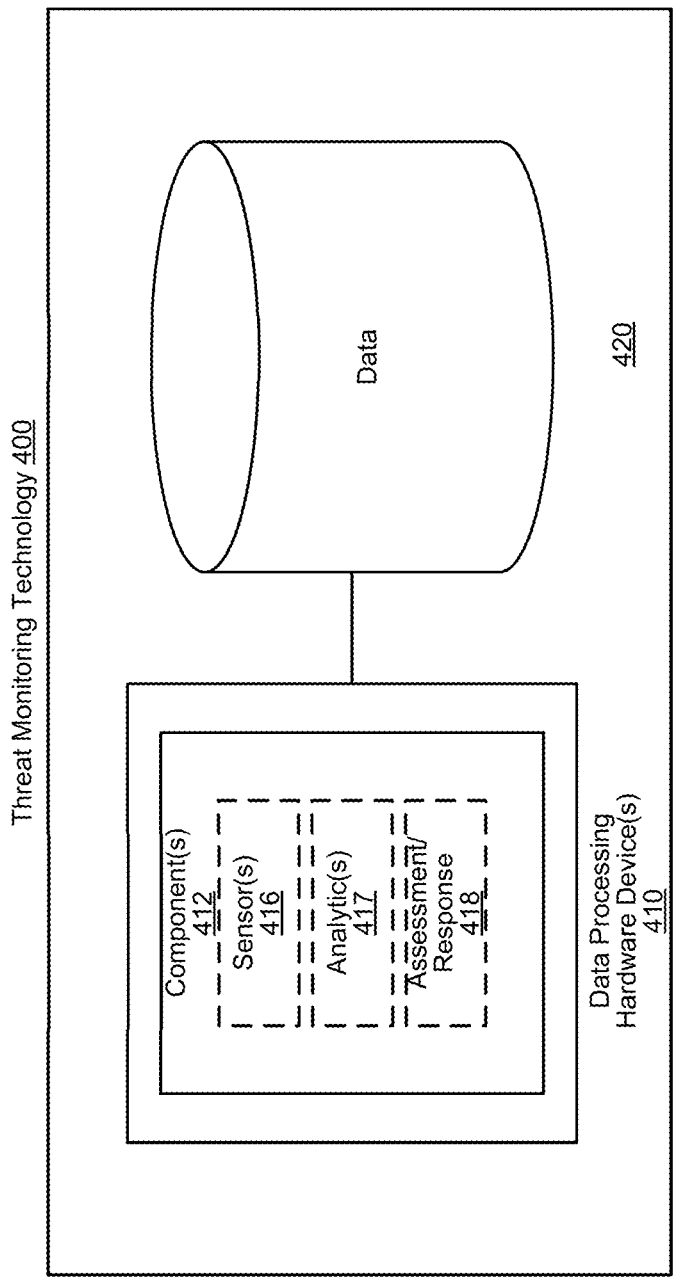
FIG. 4 is a block diagram of threat monitoring technology that may employ aspects of the described technology.

FIG. 4 is a block diagram of threat monitoring technology 400 that includes data 420 and one or more servers data processing hardware devices (e.g., a server or network appliance) 410 that include various software and/or hardware components 412, such as a sensor component 416, analytic component 417, and assessment/response component 418. Sensor component 416 is, in some embodiments, configured to monitor the target network's 300 feedback data received from various types of networking equipment configured to monitor network activity. Sensor component 416, in some embodiments, monitors target network 300 activity during a synthetic test and passes feedback data back to analytics component 417 and threat simulation technology 500. Analytics component 417 corresponds to analytic environment 214 and, in one or more embodiments, includes features for determining, e.g., if the cyberthreat was detected as described above. Assessment/response component 418 corresponds to assessment/response process 216 and, in various embodiments, assesses and responds to the synthetic threat captured by the sensor component 416 to, e.g., determine whether a response was triggered within a defined service level (e.g., a firewall detected a cyberthreat based on the threat's use of UDP port 80 to access an external IP address and, in response, the firewall dropped all corresponding traffic within 500 msecs). Each of the components 412 can individually send their respective feedback data (e.g., data 420) to the threat simulation technology 500 for further analysis, in adherence to a policy, to trigger a step of an instruction, or for determining an executable strategy for efficiently addressing deficiencies in the target network 300.

Figure 5:
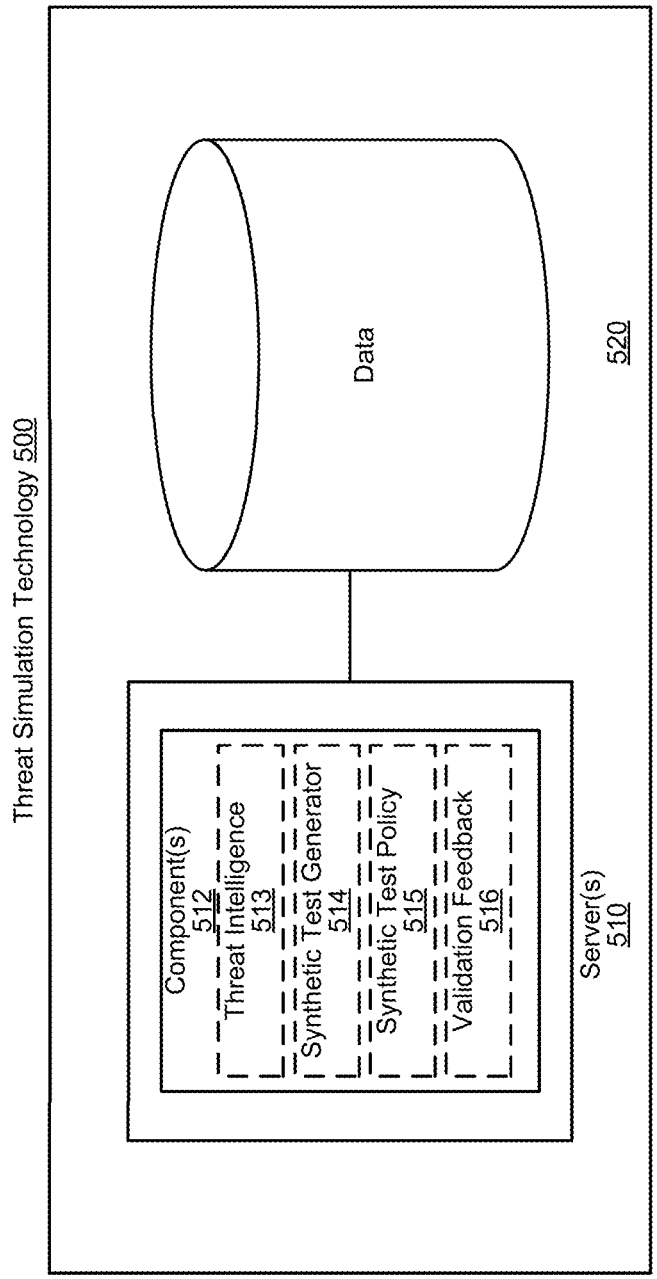
FIG. 5 is a block diagram of threat simulation technology that may employ aspects of the described technology.

FIG. 5 is a block diagram of threat simulation technology 500 that includes data 520 and server(s) 510 that include various software and/or hardware components 512, such as a threat intelligence component 513, synthetic test generator component 514, synthetic test policy component 515, and validation feedback component 516. Threat intelligence component 513, in various embodiments, is configured to fetch and/or receive information regarding the existence and details regarding cyberthreats. For example, the threat intelligence component 513 can access cyberthreat intelligence networks, local and/or remote data repositories (e.g., data 520), the dark net, etc. to determine whether a new cyberthreat has been released and, if so, what its capabilities and objectives are (e.g., to steal usernames and passwords). With this information, the synthetic test generator component 514, in various embodiments, determines, for at least a portion of a cyberthreat's objective, one or more steps of an instruction for emulating that portion of the objective. For example, if a cyberthreat's objective is to steal usernames and passwords and includes steps for infiltrating a network via running a Flash browser-based script "badscript.fl" and creating a tunnel between data 520 and an Internet server, then synthetic test generator 514 can determine corresponding instructions for execution by an agent 350 at a host 320 of a target network 300 for simulating that objective, without the hazard of the objective actually being achieved. For example, an instruction can create "badscript.fl" and open a communication tunnel between data 520 and the Internet server, without transferring any of the usernames and passwords. The agent 350, in one or more embodiments, is customized for execution based on its host's environment. For example, an agent 350 for a Windows® operating system may create c:/temp/files, create registry entries, and have instructions based in a Windows scripting language or Visual Basic, for example. A Linux-based operating system's agent 350 may create /root/temp/files, configure network.conf, and have instructions based on a shell scripting language. Regardless of the operating system or instruction type, an agent 350 can be dynamically installed on one or more hosts 320 on a target network 300. For example, the synthetic test generator 514 can deploy and initiate agents 350 via known TCP/IP-based communications protocols. Synthetic test policy component 515, in one or more embodiments, can configure the breadth, scheduling, and logic handling for agents 350 and feedback data resulting from the synthetic testing. For example, a synthetic test can be managed by the synthetic test policy component 515 to initiate the synthetic test every Saturday at 2:00 a.m. and include 50 agents on two types of hosts (e.g., Windows® and Linux) spread across a worldwide geography of three target networks. Based on responses from the testing (e.g., via feedback data returned from the target networks 300), additional steps of an instruction can be initiated, a new instruction can be determined, one or more of the target networks 300 can be (re)provisioned (e.g., by updating servers 310 and hosts 320 with recent security updates), instructions can be modified/(re)executed, or other process can initiate that can increase the efficiency at which a target network 300 can heal any vulnerabilities to one or more cyberthreats. Validation feedback component 516 receives the feedback data (discussed above) from the target network 300. The feedback data can be stored as data 520 and used by the other components 512 (e.g., the synthetic test policy component 515) to improve the efficiency of detecting, assessing, responding to, and fixing vulnerabilities.

Figure 6:
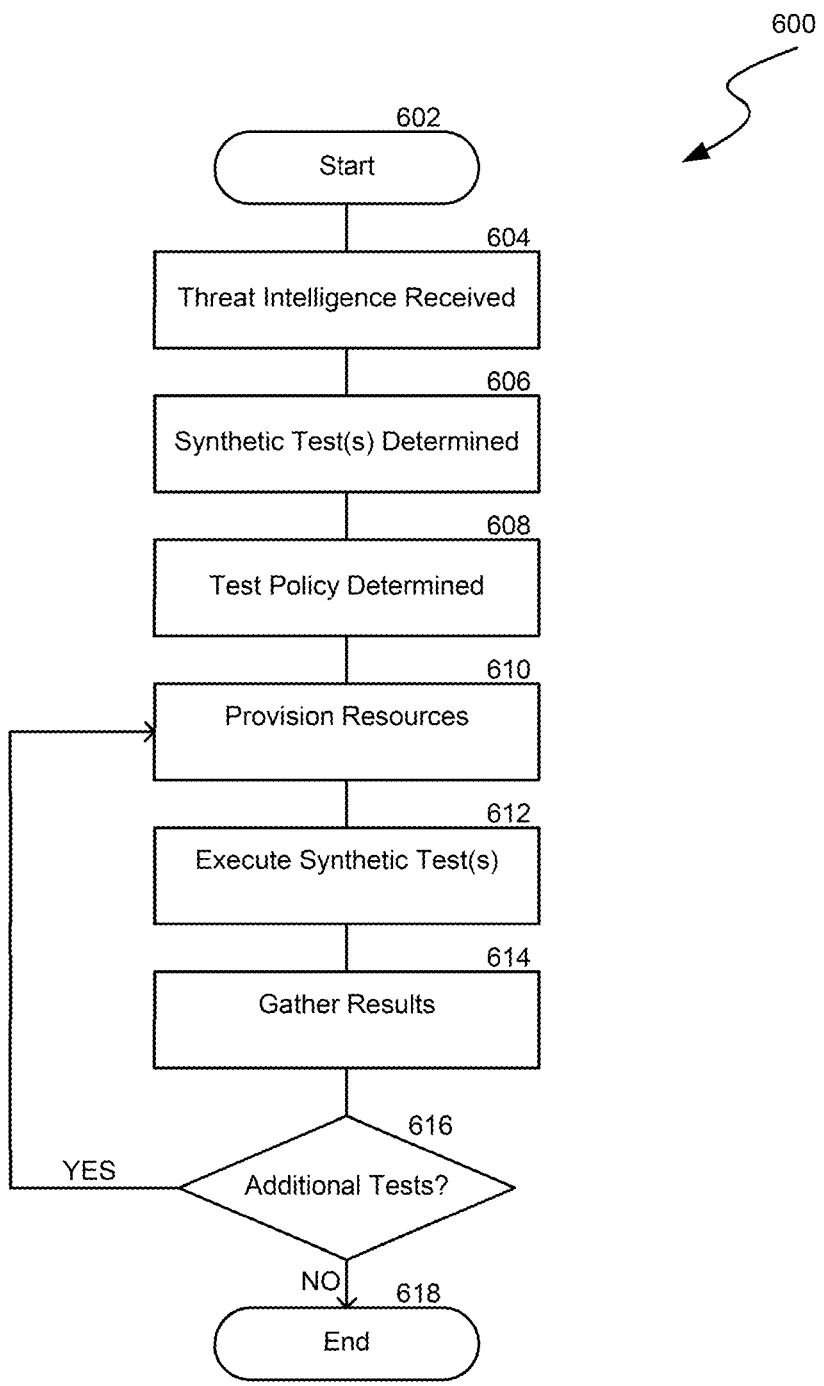
FIG. 6 is a diagram of data flow in an arrangement of components according to an embodiment of the described technology.

FIG. 6 is a flow diagram 600 depicting one or more features of the technology. Flow diagram 600 depicts an example sequence of steps 604-616 for assessing a target network 300 for vulnerabilities of a cyber-threat. The flow starts at 602 and continues to step 604, where threat intelligence is received (e.g., a new exploit was released and/or discussed on an Internet blog), and step 606, where one or more synthetic tests are determined by mapping the exploit's characteristics (e.g., any files created/accessed, communications spawned) into one or more steps of instructions for execution by an agent 350 on a host 320 at a target network 300. At step 608, one or more policies for the test are determined to, for example, run several simultaneous synthetic tests at a scheduled time. At step 610, resources required by any policies are provisioned in preparation for the testing. For example, if five agents are required by a policy that is testing for a particular spyware exploit, the technology will, in some embodiments, generate the five agents, based on the configurations of the underlying hosts 320, and install/instantiate the agents in accordance with the policy. Other provisioning may be necessary or preferred. For example, the technology can configure firewalls with rules, run system backups, and install failover systems, etc. before a test is executed, at step 612. After or during execution of a test, results are gathered and/or received, at step 614, from the target network (as described above) and, at step 616, based on analysis of the feedback data, new/modified steps/instructions/tests may be dynamically configured/installed/instantiated and initialized (e.g., based on a policy). If further testing is necessary (e.g., based on a policy) or preferred, the flow returns to step 610 where the technology provisions the target network 300 for the additional testing; however, if no additional testing is necessary, then the flow ends at step 618. Some or all of the steps are not necessary for each embodiment of the technology. Some steps can be combined or modified. For example, a previously defined policy can be used in a new test and, therefore, step 606 is not necessary. Similarly, as part of a previous test, all the intelligence necessary for a new test may already be available (e.g., stored on data 520), and therefore, step 604 would be unnecessary for the new test. Other combinations and efficiencies are contemplated.

CONCLUSION

In general, the detailed description of embodiments of the described technology is not intended to be exhaustive or to limit the described technology to the precise form disclosed above. While specific embodiments of, and examples for, the described technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.).

The term "logic," as used herein, can include, for example, special-purpose hardwired circuitry, software and/or firmware in conjunction with programmable circuitry, or a combination thereof.

These and other changes can be made to the described technology in light of the above Detailed Description. While the above description details certain embodiments of the described technology and describes the best mode contemplated, no matter how detailed the above appears in text, the described technology can be practiced in many ways. The described technology may vary considerably in its implementation details, while still being encompassed by the described technology disclosed herein. As noted above, particular terminology used when describing certain features or aspects of the described technology should not be taken to imply that the terminology is being redefined herein to be restricted to any specific characteristics, features, or aspects of the described technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments but also all equivalent ways of practicing or implementing the described technology.

To reduce the number of claims, certain aspects of the described technology are presented below in certain claim forms, but the applicant contemplates the various aspects of the described technology in any number of claim forms. For example, while only one aspect of the described technology is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for," but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:
1. A method comprising:
   receiving an indication of a cyberthreat to data security from an external source;
   determining one or more characteristics of the cyberthreat using information from the external source;
   mapping the one or more characteristics to one or more steps of an instruction;
   dynamically determining one or more agents to execute the one or more steps of the instruction in order to simulate the one or more characteristics of the cyberthreat within a target network, wherein the target network includes:
      one or more host computing devices configured to host the one or more agents; and
      one or more security devices configured to monitor activity of at least the one or more host computing devices;
   initiating execution of the instruction by the one or more agents to enable the one or more characteristics of the cyberthreat at the target network;
   receiving feedback data associated with a level of success of the one or more agents in enabling the one or more characteristics of the cyberthreat at the target network, wherein the feedback data includes data associated with:
    a number of steps of the instruction successfully completed; and
    an indication of at least one of the one or more security devices' or the one or more host computing devices' detection of or response to the one or more steps of the instruction; and
generating an analysis, based on at least a portion of the feedback data, that includes an effectiveness of the target network in detecting the cyberthreat in order to improve a capability of the one or more security devices or the one or more host computing devices at detecting or responding to the cyberthreat;
wherein the one or more characteristics of the cyberthreat are indicative of a presence of a malware being executed and comprise at least one of: creating a specific file; creating a network communication on a specific port or to a specific destination; creating or modifying a user account, a directory, or a registry; or removing a service;
wherein the one or more steps of the instruction are configured when executed to at least one of: create the specific file; create the network communication on the specific port or to the specific destination; create or access the user account, directory, or registry; or remove the service; and
wherein the one or more steps of the instruction when executed simulate the presence of the malware within the target network without executing the malware in the target network in order to test whether the target network detects and reacts to the simulated presence of the malware within the target network.

2. The method of claim 1, wherein:
the feedback data includes a plurality of status updates received during processing of the one or more steps of the instruction by the one or more agents; and
the analysis includes determining whether the one or more characteristics of the cyberthreat were accurately determined at the target network and whether any responses by the one or more security devices or the one or more host computing devices are within one or more service levels.

3. The method of claim 1, wherein the target network comprises a virtual network.

4. The method of claim 1, wherein the external source comprises a public or pseudo-public electronic resource of an availability of the cyberthreat.

5. The method of claim 1, wherein determining the one or more characteristics of the cyberthreat includes:
deriving one or more tangible results that the cyberthreat would achieve if some or all of the cyberthreat's objectives were successful.

6. The method of claim 1, wherein mapping the one or more characteristics to the one or more steps of the instruction includes:
determining logic that when executed by the one or more agents would achieve or at least partially achieve an objective of the cyberthreat if the cyberthreat were to execute the objective successfully.

7. The method of claim 1, further comprising:
prior to initiating the execution of the instruction by the one or more agents, updating the one or more security devices with known cyberthreat objectives.

8. The method of claim 1, further comprising:
based on the analysis, updating the one or more security devices with known cyberthreat objectives.

9. The method of claim 1, further comprising:
in response to a determined service-level threshold not being reached by the one or more security devices, updating at least one of the one or more security devices with known cyberthreat objectives and dynamically reinitiating execution of the instruction.

10. The method of claim 1, wherein the feedback data identifies whether the one or more security devices initiated one or more actions to counter the cyberthreat in response to the simulated presence of the malware.

11. A computer-readable storage device having instructions that, when executed by at least one processor, cause the at least one processor to perform a computer-implemented method, the computer-implemented method comprising:
determining one or more agents to produce multiple characteristics and objectives of an electronic threat to data security;
deploying the one or more agents to one or more hosts within a network environment that includes the one or more hosts and security monitoring technology;
coordinating execution of the one or more agents to produce one or more synthesized attacks based on the characteristics and objectives of the electronic threat in order to simulate the electronic threat in the network environment;
receiving feedback data associated with success of the one or more agents at producing, at the network environment, a first of the objectives of the electronic threat, wherein the feedback data includes data regarding an effectiveness of the security monitoring technology at detecting the one or more synthesized attacks; and
dynamically coordinating execution of the one or more agents to produce a second of the objectives of the electronic threat based on a determination that the first objective was achieved;
wherein the characteristics of the electronic threat are indicative of a presence of a malware being executed and comprise at least one of: creating a specific file; creating a network communication on a specific port or to a specific destination; creating or modifying a user account, a directory, or a registry; or removing a service;
wherein the one or more agents are configured to at least one of: create the specific file; create the network communication on the specific port or to the specific destination; create or access the user account, directory, or registry; or remove the service; and
wherein the one or more agents when executed simulate the presence of the malware within the network environment without executing the malware in the network environment in order to test whether the security monitoring technology detects and reacts to the simulated presence of the malware within the network environment.

12. The computer-readable storage device of claim 11, wherein the computer-implemented method further comprises:
generating a report based on the feedback data, wherein the report includes information that increases a likelihood of detecting the electronic threat at the network environment.

13. The computer-readable storage device of claim 11, wherein the computer-implemented method further comprises:

dynamically coordinating execution by the one or more agents to produce a third of the objectives of the electronic threat based on determining that the first objective or the second objective was not achieved.

14. The computer-readable storage device of claim 11, wherein the computer-implemented method further comprises:
generating, based on at least a portion of the feedback data, a strategy to improve an effectiveness of the security monitoring technology at detecting or responding to the electronic threat to prevent the objectives of the electronic threat.

15. The computer-readable storage device of claim 14, wherein the computer-implemented method further comprises:
dynamically deploying a feature of the strategy to the network environment to decrease a likelihood of success of the objectives being achieved, wherein the feature of the strategy comprises instructions for the security monitoring technology.

16. The computer-readable storage device of claim 11, wherein the computer-implemented method further comprises:
determining a policy to coordinate the one or more synthesized attacks on the network environment, wherein the policy affects at least execution timing of the one or more agents.

17. A cyberthreat assessment infrastructure comprising:
at least one processor;
at least one computer-readable storage device; and
instructions that when executed by the at least one processor cause the at least one processor to perform a computer-implemented method, the computer-implemented method comprising:
dynamically determining a synthetic test, based on one or more characteristics and one or more objectives of a real threat to information security, to assess a strength of a target network;
deploying one or more agents to one or more host computing devices to initiate one or more features of the synthetic test in the target network in order to simulate the real threat in the target network, wherein the target network includes the one or more host computing devices configured to operate with the one or more agents and data security monitoring technology configured to monitor activity at the target network;
initiating operation, via the one or more host computing devices, of the one or more agents to execute the one or more features of the synthetic test to simulate the real threat;
gathering feedback from the target network, wherein the feedback includes (i) agent data for use in determining a level of success of the one or more agents' execution of the one or more features of the synthetic test and (ii) analytic data from the data security monitoring technology regarding an amount of detection by the data security monitoring technology of at least one of the one or more features of the synthetic test; and
dynamically updating, based on the feedback, at least one of the one or more agents or the data security monitoring technology to improve detection of the one or more objectives of the real threat or to execute a next feature of the synthetic test;
wherein the one or more characteristics of the real threat are indicative of a presence of a malware being executed and comprise at least one of: creating a specific file; creating a network communication on a specific port or to a specific destination; creating or modifying a user account, a directory, or a registry; or removing a service;
wherein the one or more agents are configured to at least one of: create the specific file; create the network communication on the specific port or to the specific destination; create or access the user account, directory, or registry; or remove the service; and
wherein the one or more features of the synthetic test when executed simulate the presence of the malware within the target network without executing the malware in the target network in order to test whether the data security monitoring technology detects and reacts to the simulated presence of the malware within the target network.

18. The cyberthreat assessment infrastructure of claim 17, wherein the one or more features of the synthetic test include a sequence of steps to carry out at least a portion of the one or more objectives of the real threat.

19. The cyberthreat assessment infrastructure of claim 17, wherein the computer-implemented method further comprises:
gathering the feedback from the one or more agents to assess vulnerability of the target network to the real threat.

20. The cyberthreat assessment infrastructure of claim 17, wherein the malware comprises a virus, a Trojan horse, or a rootkit.

21. The cyberthreat assessment infrastructure of claim 17, wherein the data security monitoring technology includes one or more of an intrusion detection system (IDS), firewall, router, or server.

22. The cyberthreat assessment infrastructure of claim 17, wherein the feedback includes at least an indication of how the one or more host computing devices and the data security monitoring technology detected or responded to the synthetic test.

23. The cyberthreat assessment infrastructure of claim 17, wherein the at least one processor is configured to schedule the synthetic test to automatically initiate, at a specific time, the one or more agents.

24. The cyberthreat assessment infrastructure of claim 17, wherein the synthetic test includes a sequence of steps to carry out at least a portion of the one or more objectives of the real threat to data security.

25. A synthetic test system comprising:
at least one computing device that includes one or more memories and one or more processors that are configured to execute:
a synthetic agent engine configured to determine one or more security agents that are configured to:
operate with one or more host computing devices in a target network; and
perform instructions based on characteristics and an objective of a cyberthreat in order to simulate the cyberthreat in the target network, wherein the target network includes the one or more host computing devices and one or more data security monitoring technologies configured to assess and respond to data security threats;
a synthetic test creation engine configured to determine one or more synthetic tests to model the characteristics and objective of the cyberthreat and to assess the one or more data security monitoring technologies' capability of detecting and responding to the characteristics and objective, wherein the one or more synthetic tests include instructions for execution by the one or more security agents to achieve the objective; and a synthetic test validation engine configured to receive feedback data from the target network in order to determine a success or failure of the instructions' execution and whether any additional instructions should proceed in order to achieve the objective;

wherein the characteristics of the cyberthreat are indicative of a presence of a malware being executed and comprise at least one of: creating a specific file; creating a network communication on a specific port or to a specific destination; creating or modifying a user account, a directory, or a registry; or removing a service;

wherein the one or more synthetic tests are configured to at least one of: create the specific file; create the network communication on the specific port or to the specific destination; create or access the user account, directory, or registry; or remove the service; and wherein the one or more synthetic tests when executed simulate the presence of the malware within the target network without executing the malware in the target network in order to test whether the target network detects and reacts to the simulated presence of the malware within the target network.

26. The synthetic test system of claim 25, wherein the one or more processors are further configured to execute:
 a policy engine configured to determine:
  a specific host of the one or more host computing devices to host the one or more security agents and to perform at least a portion of the instructions; and
  a time to execute at least the portion of the instructions.

27. The synthetic test system of claim 25, wherein:
 the synthetic test validation engine is configured to receive the feedback data dynamically and automatically as one or more portions of one or more of the instructions are performed; and
 at least one of the one or more security agents is configured to receive additional instructions to perform a next cyberthreat objective based on the feedback data.

* * * * *